(12) United States Patent
Belin et al.

(10) Patent No.: US 7,238,740 B2
(45) Date of Patent: *Jul. 3, 2007

(54) RUBBER COMPOSITION FOR A TIRE COMPRISING A CITRACONIMIDO-ALKOXYSILANE AS COUPLING AGENT

(75) Inventors: Laure Belin, Riom (FR); Christiane Blanchard, Riom (FR); Salvatore Pagano, Clermont-Ferrand (FR); Christel Thonier, Mozac (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 151 days.

This patent is subject to a terminal disclaimer.

(21) Appl. No.: 10/387,826

(22) Filed: Mar. 13, 2003

(65) Prior Publication Data

US 2003/0181562 A1 Sep. 25, 2003

Related U.S. Application Data

(63) Continuation of application No. PCT/EP01/10511, filed on Sep. 12, 2001.

(30) Foreign Application Priority Data

Sep. 15, 2000 (FR) .................................. 00 11904

(51) Int. Cl.
*C08K 5/54* (2006.01)

(52) U.S. Cl. ...................... 524/495; 524/430; 524/437; 523/332.5; 523/332.6; 523/333.1

(58) Field of Classification Search ........ 524/493–495, 524/437, 430, 104; 525/332.5, 332.6, 332.7, 525/333.1
See application file for complete search history.

(56) References Cited

U.S. PATENT DOCUMENTS

| 4,271,074 | A | * | 6/1981 | Lohmann et al. | 548/406 |
| 4,301,075 | A | * | 11/1981 | Lohmann et al. | 548/548 |
| 4,565,873 | A | * | 1/1986 | Lohmann et al. | 548/110 |
| 5,278,204 | A | * | 1/1994 | Tojo et al. | 523/212 |
| 5,405,918 | A | * | 4/1995 | Hogt et al. | 525/375 |
| 6,191,286 | B1 | * | 2/2001 | Gunther et al. | 548/548 |
| 6,878,768 | B2 | * | 4/2005 | Tardivat et al. | 524/506 |
| 2005/0059773 | A1 | * | 3/2005 | Tardivat et al. | 524/588 |

FOREIGN PATENT DOCUMENTS

| EP | 0816 420 A1 | 1/1998 |
| EP | 0 939 081 A1 | 9/1999 |
| EP | 0 982 311 A2 | 3/2000 |
| JP | 01 029385 A | 1/1989 |
| WO | WO 01/49781 A1 * | 7/2001 |

* cited by examiner

*Primary Examiner*—Katarzyna Wyrozebski
(74) *Attorney, Agent, or Firm*—Fitzpatrick, Cella, Harper & Scinto

(57) ABSTRACT

The invention provides an elastomeric composition based on at least an isoprene elastomer, a reinforcing inorganic filler and, as (inorganic filler/isoprene elastomer) coupling agent, a citraconimido-alkoxysilane, in particular an N-[(($C_1$-$C_3$)alkyl-($C_1$-$C_3$)alkoxysilyl)]-citraconimide. The isoprene elastomer is in particular natural rubber and the reinforcing inorganic filler a siliceous or aluminous filler of the highly dispersible type. Also provided is a process for preparing such a composition. The use of this composition for the manufacture of tires or semi-finished products for tires, in particular treads for heavy-vehicle tires, is also provided.

61 Claims, 3 Drawing Sheets

RUBBER COMPOSITION FOR A TIRE COMPRISING A CITRACONIMIDO-ALKOXYSILANE AS COUPLING AGENT

CROSS REFERENCE TO RELATED APPLICATIONS

This application is a continuation of International Patent Application No. PCT/EP01/10511, filed on Sep. 12, 2001, and published in French as International Publication No WO 02/22728 on Mar. 21, 2002, claiming priority to French Patent Application FR 00/11904, filed Sep. 15, 2000.

FIELD OF THE INVENTION

The present invention relates to diene rubber compositions reinforced with an inorganic filler, which are intended in particular for the manufacturing of tires or semi-finished products for tires, in particular for the treads for these tires.

BACKGROUND OF THE INVENTION

It is well known that in order to obtain the optimum reinforcement properties imparted by a filler, it should be present in the elastomeric matrix in a final form which is both as finely divided as possible and distributed as homogeneously as possible. Such conditions may only be obtained insofar as the filler has a very good ability, to disagglomerate and be incorporated into the matrix during mixing, and to be dispersed homogeneously in the elastomer.

It is well known that carbon black has such abilities, which is generally not true of inorganic fillers. For reasons of mutual attraction, the inorganic filler particles have an irritating tendency to agglomerate together within the elastomeric matrix. These interactions have the harmful consequence of limiting the dispersion of the filler, causing the reinforcing properties to become substantially lower level than that which it would be theoretically possible to achieve if all the (inorganic filler/elastomer) bonds that could be created during the mixing operation were in fact obtained. These interactions tend to increase the consistency of the rubber compositions in the uncured state and to make them more difficult to work ("processability")than in the presence of carbon black.

Since fuel economies and the need to protect the environment have become priorities, it has become desirable to produce tires having reduced rolling resistance, without adversely affecting their wear resistance. This has been made possible in particular due to the discovery of new rubber compositions reinforced with specific inorganic fillers, referred to as "reinforcing" fillers. These organic fillers are comparable to conventional carbon black from the reinforcing point of view. They also impart to the rubber compositions a low hysteresis, which is synonymous with lesser rolling resistance for the tires comprising them.

Such rubber compositions, comprising reinforcing inorganic fillers of the siliceous or aluminous type, have for example been described in the following patents or patent applications EP-A-0501227 (or U.S. Pat. No. 5,227,425), EP-A-0735088 (or U.S. Pat. No. 5,852,099), EP-A-0810258 (or U.S. Pat. No. 5,900,449), EP-A-0881252, WO99/02590, WO99/02601, WO99/02602, WO99/28376, WO00/05300 and WO00/05301.

In particular, European Patent Applications, EP-A-0501227, EP-A-0735088, and EP-A-0881252, disclose diene rubber compositions reinforced with precipitated silicas of high dispersibility. Such compositions make it possible to manufacture treads having a significantly improved rolling resistance, without adversely affecting grip, endurance and wear resistance. Compositions having this combination of properties are also described in applications EP-A-0810258 and WO99/28376, with specific aluminous fillers (alumina or aluminium oxide-hydroxides) of high dispersibility as reinforcing inorganic fillers, or alternatively in applications WO00/73372 and WO00/73373, which describe specific titanium oxides of the reinforcing type.

Although the use of these specific, highly dispersible inorganic fillers as reinforcing fillers, has reduced the difficulties of processing the rubber compositions that contain them, they are still more difficult to process than rubber compositions filled conventionally with carbon black.

In particular, it is necessary to use a coupling agent, also known as a bonding agent. The coupling agent functions to provide the connection between the surface of the inorganic filler particles and the elastomer, while facilitating the dispersion of this inorganic filler within the elastomeric matrix.

The term (inorganic filler/elastomer) "coupling" agent is understood to mean an agent capable of establishing a sufficient chemical and/or physical connection between the inorganic filler and the diene elastomer. Such a coupling agent, which is at least bifunctional, has, for example, the simplified general formula "Y—W—X", in which:

Y represents a functional group (function "Y") which is capable of bonding physically and/or chemically with the inorganic filler, such a bond being able to be established, for example, between a silicon atom of the coupling agent and the surface hydroxyl (OH) groups of the inorganic filler (for example, surface silanols in the case of silica);

X represents a functional group (function "X") which is capable of bonding physically and/or chemically with the diene elastomer, for example by means of a sulphur atom;

W represents a divalent group linking Y and X.

The coupling agents should not be confused with simple agents for covering the inorganic filler. These simple agents may comprise the Y function which is active with respect to the inorganic filler, but are devoid of the X function which is active with respect to the diene elastomer.

Coupling agents, in particular (silica/diene elastomer) coupling agents, have been described in numerous documents. The most exemplary example of these coupling agents are bifunctional alkoxysilanes.

Patent application FR-A-2094859 discloses the use of a mercaptosilane coupling agent for the manufacturing of treads for tires. It was quickly discovered and is well known today that the mercaptosilanes, and in particular γ-mercaptopropyltrimethoxysilane or γ-mercaptopropyltriethoxysilane, are capable of giving excellent silica/elastomer coupling properties. However, these coupling agents cannot be used industrially because of the high reactivity of the —SH functions, which very rapidly results in premature vulcanization during the preparation of the rubber composition in an internal mixer, producing very high Mooney plasticity values, also known as "scorching". The resulting rubber compositions are virtually impossible to work with and process industrially. To illustrate the difficulty of using such coupling agents in rubber compositions that contain them industrially, the following documents, FR-A-2206330 and U.S. Pat. No. 4,002,594 may be referred to for guidance.

To overcome this drawback, these mercaptosilanes may be replaced by polysulphurized alkoxysilanes, in particular bis-($C_1$-$C_4$)alkoxysilylpropyl polysulphides, as described in numerous patents or patent applications (see for example FR-A-2206330, U.S. Pat. No. 3,842,111, U.S. Pat. No. 3,873,489, U.S. Pat. No. 3,978,103 and U.S. Pat. No. 3,997,581).

These polysulphurized alkoxysilanes are generally considered to be the products which, in the case of vulcanized rubber compositions filled with silica, provide the best compromise in terms of resistance to scorching, processability and reinforcing power. Among these polysulphides, mention must be made in particular of bis-3-triethoxysilyl-propyl tetrasulphide (abbreviated to TESPT), which is the most commonly used coupling agent in rubber compositions for tires based on a reinforcing inorganic filler. However, this compound is relatively costly and is required in a relatively large quantities.

SUMMARY OF THE INVENTION

The inventors have unexpectedly discovered that certain specific alkoxysilanes, bearing a specific activated double ethylene bond offer the rubber compositions for tires based on an isoprene elastomer, i.e. natural rubber, synthetic polyisoprenes or isoprene copolymers, an improved compromise of properties and improved coupling performance in comparison to polysulphurized alkoxysilanes, in particular TESPT. Furthermore, these specific alkoxysilanes do not have the aforementioned problems of premature scorching and of processing. These problems are inherent to rubber compositions, in particular, mercaptosilanes, and are due to excessive viscosity of the rubber compositions in the uncured state.

Alkoxysilanes, having an activated double ethylene bond, have been described for use in rubber compositions for tires (see for example JP-A-64-029385, EP-A-0982311). These coupling agents had always hitherto exhibited either excessive reactivity, resulting in the problems of scorching and increase in viscosity caused by the mercaptosilanes, or insufficient coupling performance, which in any case is distinctly inferior to those of the polysulphurized alkoxysilanes of the type TESPT.

Consequently, an object of the present invention relates to an elastomeric composition based on at least an isoprene elastomer, an inorganic filler as reinforcing filler and an (inorganic filler/isoprene elastomer) coupling agent, this composition being characterized in that this coupling agent is a citraconimido-alkoxysilane.

Another subject of the invention is the use of an elastomeric composition according to the invention for the manufacturing of tires or for the manufacturing of semi-finished products intended for such tires. These semi-finished products being selected from among the group consisting of treads, underlayers to be positioned beneath treads, crown plies, sidewalls, carcass plies, beads, protectors, inner tubes and airtight internal rubbers for tubeless tires.

The subject of the invention is also these tires and these semi-finished products themselves, when they comprise an elastomeric composition according to the invention. These tires may be used for passenger vehicles and industrial vehicles. The industrial vehicles may be selected from among vans, "heavy vehicles," i.e. subway trains, buses, road transport machinery (lorries, tractors, trailers), off-road vehicles, agricultural machinery or construction machinery, aircraft, and other transport or handling vehicles.

The invention relates in particular to the treads of tires, in particular heavy-vehicle tires. These treads can be used in the manufacturing of new tires or for recapping worn tires. Due to the compositions of the invention, these treads have all of the following properties: low rolling resistance, very good grip and high wear resistance.

The invention also relates to a process for the preparation of a composition according to the invention. This process for preparing an elastomeric composition having at least an isoprene elastomer, at least an inorganic filler as reinforcing filler, and a citraconimido-alkoxysilane, comprises kneading thermomechanically the entire mixture, in one or more stages, until a maximum temperature of between 110° C. and 190° C. is reached.

Moreover, the subject of the invention is the use of such a citraconimido-alkoxysilane as (inorganic filler/isoprene elastomer) coupling agent, in a rubber composition comprising an isoprene elastomer and reinforced with an inorganic filler.

Finally, the subject of the invention is a process for coupling an inorganic filler and an isoprene elastomer, in an elastomeric composition. This process for preparing an elastomeric composition having at least an isoprene elastomer, at least an inorganic filler as reinforcing filler, and a citraconimido-alkoxysilane, comprises kneading thermomechanically the entire mixture, in one or more stages, until a maximum temperature of between 110° C. and 190° C. is reached.

BRIEF DESCRIPTION OF THE DRAWINGS

The invention and its advantages will be readily understood in the light of the description and examples of embodiment which follow, and of the figures relating to these examples, wherein.

DETAILED DESCRIPTION OF THE INVENTION

The measurements made and tests used to characterize the rubber composition of the present invention are described below.

I Measurements and Tests Used

The rubber compositions are characterized before and after curing, as indicated below.

I-1. Mooney Plasticity

An oscillating consistometer such as described in French Standard NF T 43-005 (1991) is used. The Mooney plasticity is measured in accordance with the following principle: the raw composition (i.e. before curing) is molded in a cylindrical enclosure heated to 100° C. After one minute's preheating, the rotor turns within the test piece at 2 rpm, and the torque used for maintaining this movement is measured after four minutes' rotation. The Mooney plasticity (MS 1+4) is expressed in "Mooney units" (MU, with 1 MU=0.83 Newton.meter).

I-2. Scorching Time

The measurements are effected at 130° C., in accordance with French Standard NF T 43-005 (1991). The evolution of the consistometric index as a function of time makes it possible to determine the scorching time for the rubber compositions, assessed in accordance with the above standard by the parameter T5 (case of a large rotor), expressed in minutes, and defined as being the time necessary to obtain an increase in the consistometric index (expressed in MU) of 5 units above the minimum value measured for this index.

I-3. Tensile Tests

These tests make it possible to determine the elasticity stresses and the properties at break. Unless indicated otherwise, they are effected in accordance with French Standard NF T 46-002 of September 1988. The nominal secant moduli (or apparent stresses, in MPa) at 10% elongation (M10), 100% elongation (M100) and 300% elongation (M300) are measured in a second elongation (i.e. after a cycle of accommodation to the amount of extension provided for the measurement itself). The breaking stresses (in MPa) and the elongations at break (in %) are also measured. All these tensile measurements are effected under normal conditions of temperature and relative humidity in accordance with French Standard NF T 40-101 (December 1979).

Figure 1:
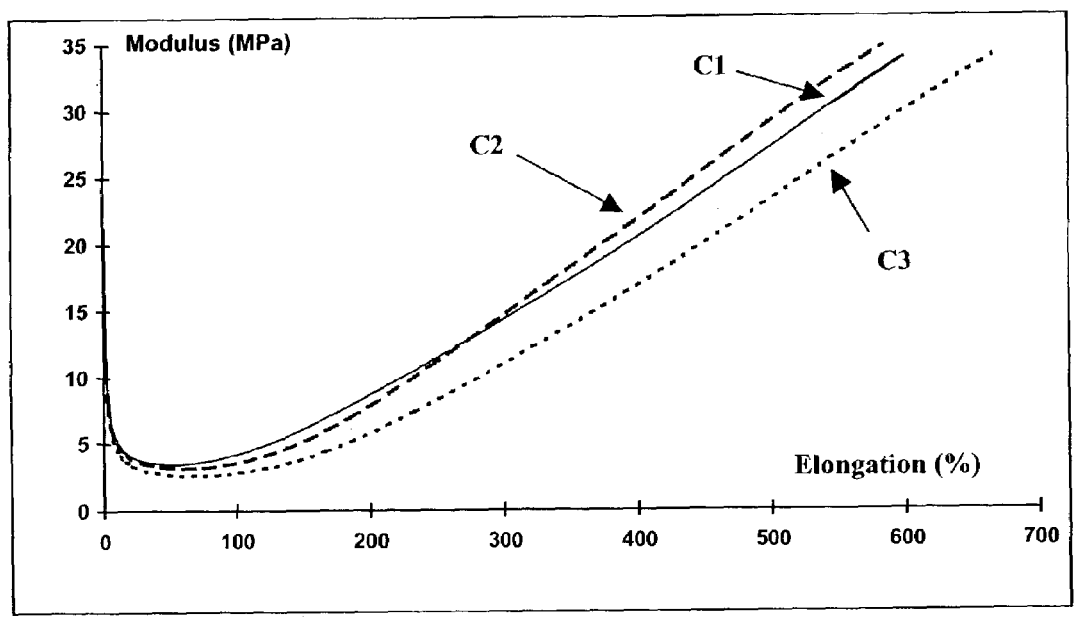
FIG. 1 shows curves of modulus as a function of elongation for rubber compositions (C1), (C2), and (C3)
Figure 2:
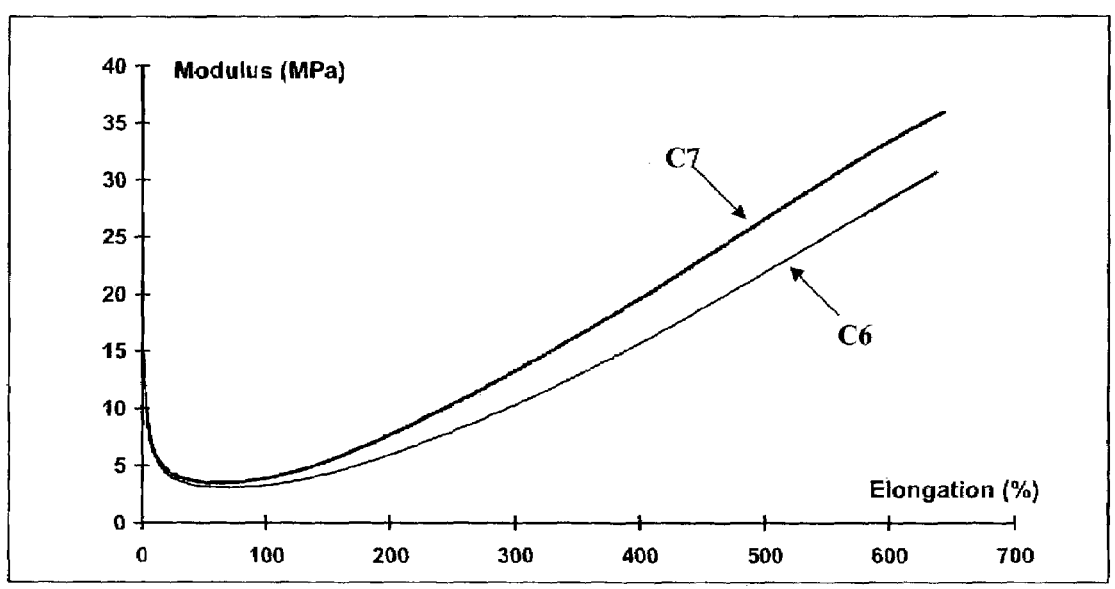
FIG. 2 shows curves of modulus as a function of elongation for rubber compositions (C6), and (C7)
Figure 3:
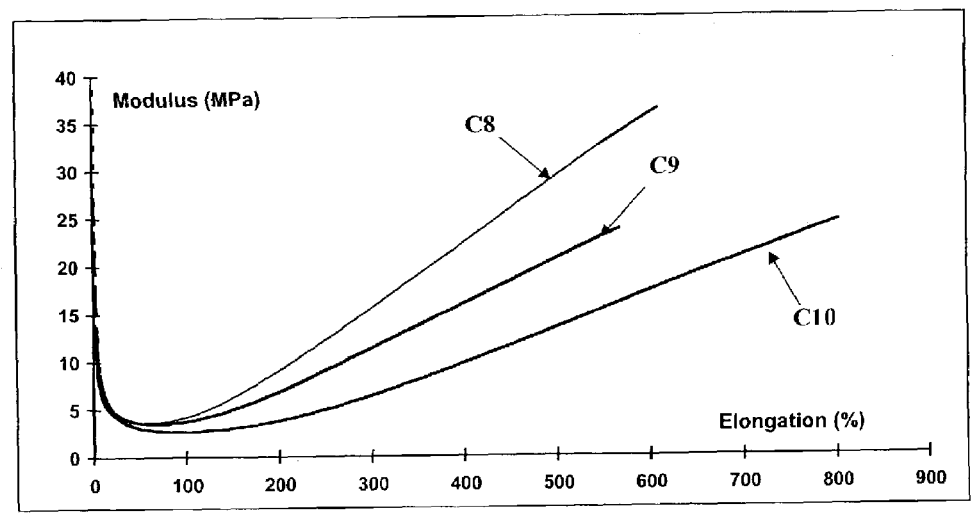
FIG. 3 shows curves of modulus as a function of elongation for rubber compositions (C8), (C9), and (C10).

Processing the tensile data recorded also makes it possible to trace the curve of the modulus as a function of the elongation, as shown in FIGS. 1-3, the modulus used here being the true secant modulus measured in a first elongation, calculated reduced to the real cross-section of the test piece, and not to the initial section as previously for the nominal moduli.

I-4. Dynamic Properties

The dynamic properties $\Delta G^*$ and $\tan(\delta)_{max}$ are measured on a viscoanalyzer (Metravib VA4000), in accordance with ASTM Standard D 5992-96. The response of a sample of vulcanized composition (cylindrical test piece of a thickness of 4 mm and a section of 400 mm$^2$), subjected to an alternating single sinusoidal shearing stress, at a frequency of 10 Hz, under normal conditions of temperature (23° C.) in accordance with Standard ASTM D 1349-99, is recorded. Scanning is effected at an amplitude of deformation of 0.1 to 50% (outward cycle), then of 50% to 1% (return cycle). The results used are the complex dynamic shear modulus ($G^*$) loss factor $\tan(\delta)$. For the return cycle, the maximum value of tan δ which is observed is d ($\tan(\delta)_{max}$), and the deviation in the complex modulus ($\Delta G^*$) between the values at 0.15 and 50% deformation (Payne effect).

II Conditions of Carrying out the Invention

The rubber compositions according to the invention are based on at least each of the following constituents: (i) an (at least one) isoprene elastomer (component A defined in more detail below); (ii) an (at least one) inorganic filler as reinforcing filler (component B defined in more detail below); and (iii) a (at least one) citraconimido-alkoxysilane (component C defined in more detail below) as (inorganic filler/isoprene elastomer) coupling agent.

The expression composition "based on" means a composition comprising the mix and/or the reaction products of the various constituents used, formed in situ, wherein some of these base constituents are able to react with one another at least in part, during the various phases of manufacturing the composition, in particular during the vulcanization thereof.

II-1. Diene Elastomer (Component A)

"Diene" elastomer (or rubber) means, generally, an elastomer obtained at least in part (i.e. a homopolymer or a copolymer) from diene monomers, i.e. monomers bearing two double carbon-carbon bonds, whether conjugated or not. "Essentially unsaturated" diene elastomer means a diene elastomer obtained at least in part from conjugated diene monomers, having a content of members or units of diene origin (conjugated dienes) which is greater than 15% (mol %). Within the category of "essentially unsaturated" diene elastomers, "highly unsaturated" diene elastomer means a diene elastomer having a proportion of units of diene origin (conjugated dienes) which is greater than 50%.

The above general definitions having being given, "isoprene elastomer" means in the present application an isoprene homopolymer or copolymer. In other words, an "isoprene elastomer" means a diene elastomer selected from the group consisting of natural rubber (NR), synthetic polyisoprenes (IR), the various isoprene copolymers and mixtures of these elastomers. Among the isoprene copolymers, particular mention can be made of isobutene-isoprene copolymers (butyl rubber—IIR), isoprene-styrene copolymers (SIR), isoprene-butadiene copolymers (BIR) or isoprene-butadiene-styrene copolymers (SBIR).

The isoprene elastomer is preferably natural rubber or a synthetic polyisoprene of the cis-1,4 type. Among the synthetic polyisoprenes, polyisoprenes having a content (mole %) of cis-1,4 bonds greater than 90% are preferred, while those polyisoprenes having greater than 98%, are more preferably used.

In combination with the isoprene elastomer mentioned above, the compositions of the invention may contain other diene elastomers in a minority proportion (i.e. for less than 50% by weight) or a majority proportion (i.e. for more than 50% by weight), depending on the intended applications. These compositions may also comprise non-diene elastomers, or polymers other than elastomers, for example thermoplastic polymers.

For diene elastomers other than isoprene elastomers, particular mention can be made of any highly unsaturated diene elastomer selected from the group consisting of polybutadienes (BR) and butadiene copolymers, in particular styrene-butadiene copolymers (SBR), and mixtures of these different elastomers.

If diene elastomers other than isoprene ones are used, the person skilled in the art of tires will readily understand that coupling agents other than the citraconimido-alkoxysilane, for example polysulphurized alkoxysilanes may then be advantageously used to couple these complementary diene elastomers.

The improvement in the coupling provided by the invention is particularly suitable for rubber compositions having an elastomeric base comprising more than 50% by weight of polyisoprene, i.e. natural rubber or synthetic polyisoprene.

The composition according to the invention is particularly useful for a tread for a tire, either for a new tire or recapping a used tire, particularly for a tread for a heavy-vehicle tire.

In such a case, the best known embodiment of the invention consists of using solely polyisoprene as the isoprene elastomer, more preferably natural rubber. The best performance in terms of rolling resistance and wear resistance have been observed using such conditions.

However, the person skilled in the art of tires will appreciate that various blends between the isoprene elastomer, such as natural rubber and other diene elastomers, such as SBR and/or BR, are also possible in rubber compositions according to the invention. These compositions are usable for various parts of the tire other than its tread, for example sidewalls, or protectors for tires on passenger vehicles, vans or heavy vehicles, whether these blends have a minority or a majority proportion of the isoprene elastomer.

II-2. Reinforcing Filler (Component B)

The white or inorganic filler used as reinforcing filler may constitute all or only part of the total reinforcing filler, in this latter case associated, for example, with carbon black.

Preferably, in the rubber compositions of the present invention, the reinforcing inorganic filler constitutes the majority, i.e. more than 50% by weight, of the total reinforcing filler, more preferably more than 80% by weight of this total reinforcing filler.

In the present application, "reinforcing inorganic filler" means an inorganic or mineral filler, independent of its color and its origin, i.e. natural or synthetic. The reinforcing inorganic filler is also referred to as "white" filler or "clear" filler. In contrast to carbon black, this inorganic filler is capable, on its own, without any other means than an intermediate coupling agent, of reinforcing a rubber composition intended for the manufacturing of tires. In other words, the reinforcing inorganic filler is capable of replacing in its reinforcement function a conventional tire grade carbon black filler.

Preferably, the reinforcing inorganic filler is a mineral filler of the siliceous type, silica ($SiO_2$), or of the aluminous type, alumina ($Al_2O_3$) or aluminium oxyhydroxides, or a mixture of these listed fillers.

The silica used may be any reinforcing silica known to the person skilled in the art, in particular any precipitated or pyrogenic silica having a BET surface area and a specific CTAB surface area both of which are less than 450 $m^2/g$, preferably from 30 to 400 $m^2/g$. Highly dispersible precipitated silicas (referred to as "HD") are preferred, especially when the invention is used for the manufacturing of tires having a low rolling resistance. "Highly dispersible silica" means any silica having a substantial ability to disagglomerate and to disperse in an elastomeric matrix, which can be observed in known manner by electron or optical microscopy on thin sections.

Non-limiting examples of such preferred highly dispersible silicas, include silica Ultrasil 7000 from Degussa, the silicas Zeosil 1165MP and 1115MP from Rhodia Chimie, the silica Hi-Sil 2000 from PPG, the silicas Zeopol 8715 or 8745 from Huber, and treated precipitated silicas such as, for example, the aluminium-"doped" silicas described in EP-A-0735088.

The reinforcing alumina preferably used is a highly dispersible alumina having a BET surface area from 30 to 400 $m^2/g$, more preferably between 60 and 250 $m^2/g$, and an average particle size at most equal to 500 nm, more preferably at most equal to 200 nm, as described in EP-A-0810258. Non-limiting examples of such reinforcing aluminas include the aluminas "Baikalox", "A125", "CR125", "D65CR" (from Baïkowski), APA-100RDX (from Condéa), Aluminoxid C (from Degussa) or AKP-G015 (Sumitomo Chemicals).

Other examples of reinforcing inorganic filler which may be used in the rubber compositions of the present invention include the aluminium (oxide)hydroxides and the specific titanium oxides described in International applications WO99/28376, WO00/73372, WO00/73373.

The reinforcing inorganic filler may be in the form of a powder, microbeads, granules, balls or any other densified form. "Reinforcing inorganic filler" may also refer to mixtures of different reinforcing inorganic fillers, in particular of highly dispersible siliceous and/or aluminous fillers described above.

When the rubber compositions of the present invention are used as treads for tires, the reinforcing inorganic filler used, in particular if it is silica, preferably has a BET surface area of between 60 and 250 $m^2/g$, more preferably between 80 and 200 $m^2/g$.

The reinforcing inorganic filler may also be used in a blend (mixture) with carbon black suitable carbon blacks are all the carbon blacks, in particular the blacks of the type HAF, IASF and SAF, which are conventionally used in tires, and particularly in treads for tires. As non-limitative examples of such blacks, mention may be made of the blacks N115, N134, N234, N339, N347 and N375.

The amount of carbon black present in the total reinforcing filler may vary within wide limits, this amount of carbon black preferably being less than the amount of reinforcing inorganic filler present in the rubber composition.

In the compositions according to the present invention, it is preferred to use carbon black in a small proportion in association with the reinforcing inorganic filler, preferably in an amount of between 2 and 20 phr, more preferably within a range of 5 to 15 phr (phr=parts by weight per hundred parts of elastomer or rubber). Within the cited ranges indicated, the composition benefits from the coloring properties (black pigmentation agent), and anti-UV properties of the carbon blacks, without penalization of the typical performance provided by the reinforcing inorganic filler, namely low hysteresis (reduced rolling resistance) and high adhesion both on wet ground and on snow-covered or icy ground.

Preferably, the amount of total reinforcing filler (reinforcing inorganic filler plus carbon black if present) is between 10 and 200 phr, more preferably between 20 and 150 phr (parts by weight per hundred parts of elastomer), the optimum value being different depending on the intended application. In fact, the level of reinforcement required of a bicycle tire is in known manner distinctly lower than that required for a tire travelling at a sustained high speed, for example a motorcycle tire, a passenger-vehicle tire or a tire for a utility vehicle such as a heavy vehicle.

For treads for tires which are intended for travel at high speeds, the quantity of reinforcing inorganic filler, especially in the case of silica, is preferably between 30 and 120 phr, more preferably between 30 and 100 phr.

It will be understood that when the sole diene elastomer present in the composition according to the invention is an isoprene elastomer, the abbreviation "phr" may then be replaced by "phi" (parts by weight per hundred parts of isoprene elastomer).

In the present specification, the BET specific surface area is determined in known manner, in accordance with the method of Brunauer, Emmett and Teller described in "The Journal of the American Chemical Society", vol. 60, page 309, February 1938, which corresponds to French standard NF T 45-007 (November 1987). The CTAB specific surface area is the external surface area determined in accordance with the same Standard NF T 45-007.

A person skilled in the art will understand that a filler equivalent to the reinforcing inorganic filler described in the present section may also be used. For example, a reinforcing filler of organic type, in particular a carbon black for tires (see for example WO99/28380), covered at least in part with an inorganic layer requires the use of a coupling agent to provide the bond to the elastomer.

II-3. Coupling Agent (Component C)

It is well known that an (inorganic filler/diene elastomer) coupling agent bears at least two functions, here denoted as "Y" and "X", which enable it to bond to the reinforcing inorganic filler by means of the function Y to the diene elastomer by means of the function X.

The coupling agent used in the rubber compositions of the invention is a citraconimido-alkoxysilane. The coupling agent is thus at least bifunctional organosilane comprising per molecule:

(i) at least one alkoxyl group (function "Y")on its silicon atom, making it possible for it to bond to the reinforcing inorganic filler; and (ii) at least one citraconimide group (function "X"), making it possible for it to bond to the isoprene elastomer.

Such a silane corresponds in known manner to the general formula (I) below (Me=methyl):

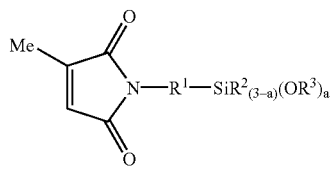

(I)

in which "a" is equal to 1, 2 or 3, $R^1$ is a divalent group intended to provide the bond with the silicon atom, $R^2$ and $R^3$ are monovalent hydrocarbon groups.

It can be seen in this formula (I) that the function X of this coupling agent is the citraconimide function attached to the silicon atom by means of the radical $R^1$, characterized by the presence of a double ethylene bond (C=C) activated by an adjacent carbonyl group (C=O). The function Y is an alkoxysilyl function, represented by one to three alkoxyl group(s) ($OR^3$) attached to the silicon atom.

The radical $R^1$, whether substituted or non-substituted, is preferably a saturated or non-saturated hydrocarbon radical, comprising from 1 to 18 carbon atoms, said radical $R^1$ possibly comprising within the hydrocarbon chain at least one heteroatom such as O, S or N. In particular $C_1$-$C_{18}$ alkylene groups or $C_6$-$C_{12}$ arylene groups, more particularly $C_1$-$C_{10}$ alkylenes, notably $C_2$-$C_4$ alkylenes, in particular propylene, are suitable.

$R^2$ and $R^3$, which may be identical or different, straight-chain or branched, preferably comprise from 1 to 15 carbon atoms. These radicals $R^2$ and $R^3$ comprising from 1 to 15 carbon atoms are preferably selected from among alkyls, cycloalkyls or aryls, in particular from among $C_1$-$C_6$ alkyls, $C_5$-$C_8$-cycloalkyls and the phenyl radical. More preferably still, $R^2$ and $R^3$ are $C_{1-C3}$ alkyls, in particular selected from among methyl or ethyl.

In other words, the invention is preferably implemented with a citraconimido-($C_1$-$C_3$)alkyl-($C_1$-$C_3$)alkoxysilane, more preferably a citraconimido-propyl-($C_1$-$C_3$)alkoxysilane in which the alkoxyl group(s) is/are selected from among methoxyl or ethoxyl, more preferably ethoxyl.

Such compounds are well known (see for example EP-A-0982311) and may be prepared, in accordance with a preferred synthesis method, by reaction of an aminoalkylalkoxysilane on citraconic anhydride in the presence of an anhydrous organic solvent (for example toluene), a catalyst of the Lewis acid type (for example $ZnCl_2$) and a cyclizing agent such as hexamethyldisilazane (HMDS).

The citraconimido-alkoxysilanes previously described have proved sufficiently effective used alone for coupling an isoprene elastomer and a reinforcing inorganic filler such as silica. They may advantageously be used as the sole coupling agent present in the rubber compositions of the present invention, especially when the diene elastomer consists exclusively of an isoprene elastomer, in particular natural rubber or synthetic cis-1,4 polyisoprene.

The content of component (C) is preferably greater than 0.5 phi, more preferably between 1 and 15 phi. Below the minimum amounts indicated, the effect is inadequate. Whereas above the maximum amount, the cost of the composition increases and no further improvement in the coupling is observed. For these various reasons, the content of component C is more preferably between 2 and 10 phi.

The person skilled in the art will be able to adjust this content of component C according to the intended application, in particular to the part of the tire for which the rubber composition of the invention is intended, to the nature of the isoprene elastomer and to the quantity of reinforcing inorganic filler used. In order to reduce the costs of the rubber compositions, it is desirable to use as little of component C as possible. The amount of component C used for the rubber composition should be sufficient for coupling between the isoprene elastomer and the reinforcing inorganic filler. Its effectiveness makes it possible, in a large number of cases, to use the citraconimido-alkoxysilane in a preferred amount representing between 0.5% and 20% by weight relative to the quantity of reinforcing inorganic filler; amounts less than 15%, in particular less than 10%, are more particularly preferred.

The citraconimido-alkoxysilanes previously described may be grafted beforehand on to the reinforcing inorganic fillers, especially to silica, by means of their alkoxyl function(s). The reinforcing inorganic fillers are thus "pre-coupled" and able to be linked to the isoprene elastomer by means of their free citraconimide function.

II-4. Various Additives

Of course, the rubber compositions according to the present invention also comprise all or part of the additives usually used in rubber compositions comprising an isoprene elastomer and intended for the manufacturing of tires or tire treads, such as, for example, plasticisers, protective agents such as anti-ozone waxes, chemical antiozonants, antioxidants, anti-fatigue agents, adhesion promoters, a cross-linking system such as those based either on sulphur or on sulphur and/or peroxide and/or bismaleimide donors, vulcanization accelerators, vulcanization activators, etc. There may also be associated with the reinforcing inorganic filler, if necessary, a conventional poorly reinforcing or non-reinforcing inorganic filler, for example particles of clay, bentonite, talc, chalk, kaolin or conventional (non-reinforcing) titanium oxides.

The rubber compositions according to the present invention may also contain, in addition to the citraconimido-alkoxysilanes (component C) previously described, agents for covering the reinforcing inorganic filler, comprising for example the single function Y, or more generally processing aids liable, in known manner, due to an improvement in the dispersion of the inorganic filler in the rubber matrix and to a reduction in the viscosity of the compositions, to improve their ability to be worked in the uncured state. These agents include alkylalkoxysilanes, in particular alkyltriethoxysilanes, such as the 1-octyl-triethoxysilane sold by Hüls under the name Dynasylan Octeo, or the 1-hexa-decyl-triethoxysilane sold by Degussa under the name Si216, polyols, polyethers (for example polyethylene glycols), primary, secondary or tertiary amines (for example trialkanolamines), hydroxylated or hydrolysable polyorganosiloxanes, for example α,ω-dihydroxy-polyorganosiloxanes (especially α,ω-dihydroxy-polydimethylsiloxanes).

As indicated previously, the compositions according to the invention may also contain coupling agents other than component C, for example polysulphurized alkoxysilanes. Especially when these compositions contain, in addition to the isoprene elastomer, other diene elastomers, for example of the SBR and/or BR type, the coupling of which to the reinforcing inorganic filler may then be advantageously effected by conventional coupling agents such as polysulphurized alkoxysilanes.

II-5. Preparation of the Rubber Compositions

The compositions are produced in suitable mixers, using two successive preparation phases well-known to the person skilled in the art: a first phase of thermomechanical working or kneading (sometimes referred to as "non-productive" phase) at high temperature, up to a maximum temperature ($T_{max}$) of between 110° C. and 190° C., preferably between 130° C. and 180° C., followed by a second phase of mechanical working (sometimes referred to as "productive" phase) at lower temperature, typically less than 110° C., for example between 40° C. and 100° C., during which finishing phase the cross-linking or vulcanization system is incorporated. Such phases have been described for example in the aforementioned applications EP-A-0501227, EP-A-0735088, EP-A-0810258, EP-A-0881252, WO99/28376, WO00/05300 or WO00/05301.

The production process according to the present invention is characterized by kneading at least component B and component C into component A during the first, so-called non-productive, phase. At least these different base constituents are introduced into the mixer and are kneaded thermomechanically, in one or more stages, until a maximum temperature of between 110° C. and 190° C., preferably between 130° C. and 180° C., is reached.

By way of example, the first (non-productive) phase is effected in a single thermomechanical step during which all the base constituents necessary, any additional covering agents or processing agents and various other additives, with the exception of the vulcanization system, are introduced into a suitable mixer, such as a conventional internal mixer. A second stage of thermomechanical working may be added, in this internal mixer, after the mixture has dropped and after intermediate cooling (cooling temperature preferably less than 100° C.) with the aim of making the compositions undergo complementary heat treatment and thus improving further the dispersion in the elastomeric matrix of the reinforcing inorganic filler and its coupling agent. The total duration of the kneading, in this non-productive phase, is preferably between 2 and 10 minutes.

After cooling of the mixture, the vulcanization system is then incorporated at low temperature, generally in an external mixer such as an open mill. The entire composition is then mixed (productive phase) for preferably several minutes, for example between 5 and 15 minutes.

The final composition thus obtained is then calendered, for example in the form of a film or a sheet, or alternatively extruded, for example in order to form a rubber profiled element used for manufacturing semi-finished products such as treads, crown plies, sidewalls, carcass plies, beads, protectors, inner tubes or airtight internal rubbers for tubeless tires.

The vulcanization (or curing) is carried out at a temperature generally between 130° C. and 200° C., for a period which may vary between 5 and 90 minutes, depending on the curing temperature, the vulcanization system adopted and the vulcanization kinetics of the composition in question, or alternatively on the size of the tire.

The vulcanization system proper is preferably based on sulphur and a primary vulcanization accelerator, in particular an accelerator of the sulphenamide type. To this basic vulcanization system, various known secondary accelerators or vulcanization activators such as zinc oxide, stearic acid, guanidine derivatives (in particular diphenylguanidine), etc. are added and incorporated during the first non-productive phase and/or during the productive phase. The sulphur is used in a preferred amount of between 0.5 and 10 phr, more preferably of between 0.5 and 5.0 phr, for example between 0.5 and 3.0 phr when the invention is applied to a tire tread. The primary vulcanization accelerator is used in a preferred amount of between 0.5 and 10 phr, more preferably of between 0.5 and 5.0 phr in particular when the invention applies to a tire tread.

The invention relates to the rubber compositions previously described, both in the "uncured" state (i.e. before curing) and in the "cured" or vulcanized state (i.e. after cross-linking or vulcanization).

The compositions according to the invention may be used alone or in a blend (i.e. in a mixture) with any other rubber composition which can be used for manufacturing tires.

III EXAMPLES OF EMBODIMENT OF THE INVENTION

III-1. Synthesis of the Coupling Agent

For the requirements of these tests, N-(propyltriethoxysilyl)citraconimide (3) is prepared by reaction of citraconic anhydride (1) on 3-aminopropyltriethoxysilane (2), using a process for the synthesis of N-alkyl- and N-arylimide derivatives such as described in J. Org. Chem., Vol. 62, No. 8, 2652-2654, 1997.

The synthesis equation is as follows:

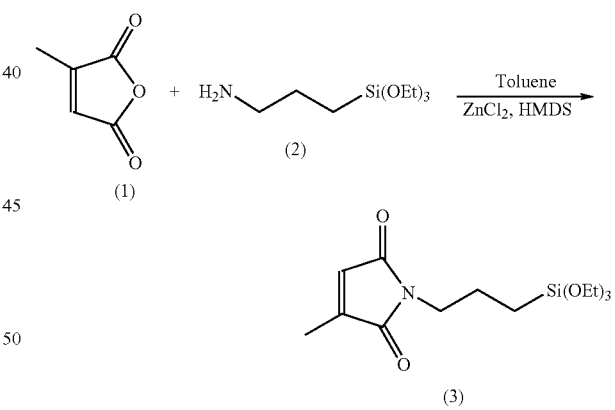

First of all the citraconic anhydride (1) (69.9 mmol, namely 6.4 ml or 7.8 g) diluted in 200 ml toluene is introduced into a 500 ml three-necked flask provided with a bar magnet and surmounted by a condenser. The 3-aminopropyltriethoxysilane (2) (69.9 mmol, namely 16.4 ml or 15.4 g), diluted in 120 ml of toluene, is added to the preceding solution, drop by drop, using a dropping funnel.

After 5 hours' stirring at ambient temperature, the total disappearance of the aminopropyltriethoxysilane was observed by GPC (gas phase chromatography), whereas the N-[propyltriethoxysilyl]citraconamic acid formed is characterized by high-performance liquid chromatography (HPLC).

9.5 g of $ZnCl_2$ is then added to the reaction medium, in a single step. Once the water bath has been brought to 80° C., 1.5 equivalents (104.5 mmol, namely 22.6 ml or 16.9 g) hexamethyldisilazane (HMDS) diluted in 120 ml of toluene is added, by means of a dropping funnel, for approximately 30 minutes.

After two hours of heating, the appearance of a new peak is noted in HPLC and, in GPC, one observes the disappearance of the N-[propyltriethoxysilyl]citraconamic acid. The heating is then stopped, while the stirring is continued overnight. The reaction medium is filtered over fritted glass and the filtrate obtained is volatilized; filtration on a microfilter makes it possible to eliminate the residual $ZnCl_2$ and the traces of HMDS are eliminated by distillation in a marble furnace.

Thus 19.6 g of a viscous orange liquid is obtained, NMR analysis of the proton and the silicon of which reveals that it corresponds to the following formula (yield of the reaction: 90%):

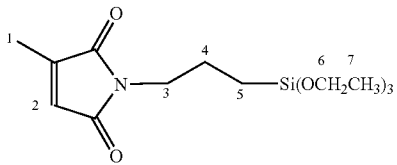
(3)

For the requirements of comparative tests, N-(propyltriethoxysilyl)-maleimide is prepared by proceeding in the same manner (except for the differences in molar weights) as above, and substituting the citraconic anhydride with maleic anhydride.

III-2. Preparation of the Rubber Compositions

The rubber compositions are prepared in accordance with the following scheme. The isoprene elastomer (or the mixture of diene elastomers, if applicable), the reinforcing filler, the coupling agent, then the various other ingredients, with the exception of the vulcanization system, are introduced into an internal mixer filled to 70%, with the initial tank temperature at approximately 60° C. Thermomechanical working (non-productive phase) is then performed in one or two stages for a total duration of kneading time equal to about 7 minutes, until a maximum "dropping" temperature of about 165° C. is reached. The mixture thus obtained is recovered, cooled, and then sulphur and sulphenamide are added on an external mixer (homo-finisher) at 30° C., by mixing everything (productive phase) for 3 to 4 minutes.

The compositions thus obtained are then calendered in the form of sheets with a thickness of 2 to 3 mm or of thin films of rubber in order to measure their physical or mechanical properties, or extruded to form profiled elements which can be used directly, after cutting out and/or assembly to the dimensions desired, for example as semi-finished products for tires, in particular as treads for heavy-vehicle tires.

The following tests will demonstrate that the isoprene elastomer is a natural rubber and the reinforcing inorganic filler is used, in the compositions according to the present invention, in a preferred amount of between 30 and 100 phr. All the compositions tested comprise (not included in the tables of results) a small proportion of carbon black N330 (approximately 5 to 6 phr) used as black pigmentation and anti-UV agent.

III-3. Characterization Tests

A) Test 1

The object of this test is to demonstrate the improved (inorganic filler/isoprene elastomer) coupling performances in a composition according to the present invention in comparison to a reference composition of the prior art, using the conventional coupling agent polysulphurized alkoxysilane (TESPT); and another control composition using an alkoxysilane as coupling agent which also comprises a double ethylene bond activated by an adjacent carbonyl group, namely trimethoxy-silylpropyl methacrylate (TMSPM).

It will be recalled that TEPST is bis(3-triethoxysilylpropyl) tetrasulphide, having the formula $[(C_2H_5O)_3Si(CH_2)_3S_2]_2$ and is sold by Degussa under the name "Si69" (or "X50S" when it is supported to 50% by weight on carbon black), or alternatively by Witco under the name "Silquest A1289." For both products, a commercial mixture of polysulphides $S_n$, has an average value of n which is close to 4.

As for the TMSPM, it is sold for example by Hüls under the name "Dynasylan Memo", and corresponds to the known formula (II) (see for example DE-A-4319142 or U.S. Pat. No. 5,484,848):

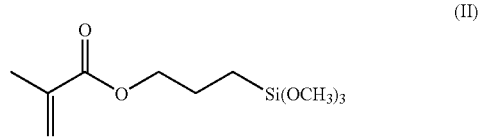
(II)

Three rubber compositions based on natural rubber and reinforced with silica, denoted as C-1 to C-3, are prepared. These compositions can be used for treads for heavy-vehicle tires.

The following three compositions are identical with the exception of the coupling agent used:
composition C-1: TESPT;
composition C-2: citraconimido-alkoxysilane synthesised above (§ III-1);
composition C-3: TMSPM.

The three organosilanes tested are used in an isomolar amount of silicon. For each composition tested, the same number of moles of alkoxysilyl functions which are reactive with respect to the silica and its hydroxyl surface groups is used. Relative to the weight of polyisoprene, the amount of silane in all three cases is less than 5 phi. This quantity represents less than 10% by weight relative to the quantity of reinforcing inorganic filler.

Table 1 shows the formulation of the different compositions. The amounts of the different products are expressed in phr or phi. Table 2 shows the properties before and after curing, approximately 30 min at 150° C. The vulcanization system is formed of sulphur and sulphenamide. FIG. 1 shows the curves of modulus (in MPa) as a function of the elongation (in %) corresponding to compositions C-1 to C-3, respectively.

The scorching times (T5) are sufficiently long in all cases, i.e. more than 20 minutes, offering a large safety margin with respect to the problem of scorching.

The Mooney plasticity values remain low, i.e. at most equal to 30 MU, independent of the composition in question. This is an indicator of very good ability of the compositions to be processed in the uncured state.

After curing, the composition (C-2) has the highest values of modulus under high deformation (M300) and the highest ratio M300/M100. These values are known indicators to the person skilled in the art of the quality of the reinforcement provided by the inorganic filler.

In comparison with the reference composition C-1, the composition C-2 exhibits substantially improved hysteresis properties, as illustrated by a lower value ΔG*, which is synonymous with reduced rolling resistance.

In comparison with the control composition C-3, composition C-2 exhibits a better compromise of properties in terms of reinforcement and hysteresis.

This overall improved behaviour of the composition C-2 according to the invention illustrates a high quality of the bond or coupling between the reinforcing inorganic filler and the isoprene elastomer.

FIG. 1 supports the preceding observations that the composition of the invention (C-2) reveals a greater level of reinforcement for the greatest elongations (300% and more) than the reference composition C-1, and distinctly better reinforcement, whatever the elongation in question, than the reference composition C-3.

B) Test 2

This test shows that the compositions according to the present invention, comprising as coupling agent a citraconimido-alkoxysilane, have an improved compromise of properties in comparison with known compositions using a different alkoxysilane as coupling agent also comprising a double ethylene bond activated by an adjacent carbonyl group, namely a maleimido-alkoxysilane.

For this test, two rubber compositions are prepared, which are based on natural rubber and reinforced with silica, and are intended for treads for heavy-vehicle tires. These two compositions have an identical formulation, with the exception of the coupling agent used composition C-4: citraconimido-triethoxysilane (4.7 phr) and composition C-5: maleimido-triethoxysilane (4.5 phr).

It will be recalled here that maleimido-triethoxysilane has the known formula (III) (see the aforementioned applications JP64-029385 and EP 0 982 311)

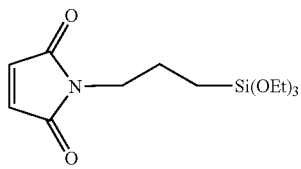

(III)

Relative to the formula above, citraconimido-triethoxysilane, of formula (IV):

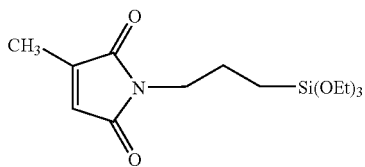

(IV)

is therefore distinguished only by the presence, on the double ethylene bond, of a methyl group ($CH_3$) instead of a hydrogen atom.

Tables 3 and 4 give the formulation of the different compositions and their properties before and after curing (35 min, 150° C.). Composition C-4 is identical to the composition C-2 previously tested. The two coupling agents are used in an isomolar amount of triethoxysilane functions. Relative to the weight of polyisoprene, the amount of coupling agent is in both cases less than 5 phi, or less than 10% by weight relative to the quantity of reinforcing inorganic filler.

The different results of Table 4 show that composition C-4, compared with the control C-5, has an improved compromise properties with admittedly coupling performances which are substantially equivalent, as illustrated by similar values of moduli M100, M300, of ratio M300/M100 and of breaking stress, but unexpectedly, exhibit a very distinctly reduced Mooney viscosity (reduction of 42 MU).

In other words, the citraconimido-alkoxysilane provides an excellent quality of bonding between the isoprene elastomer and the inorganic filler, as already demonstrated in Test 1 above, while offering, despite a very similar chemical structure, processing in the uncured stated which is very greatly improved compared with the maleimido-alkoxysilane.

C) Test 3

This test illustrates the beneficial effect of the invention in a composition based on natural rubber, comprising a different type of reinforcing inorganic filler, in this case a highly dispersible alumina such as described in the aforementioned application EP-A-0810258.

The following two compositions tested are identical except for the following differences composition C-6: TESPT coupling agent (4 phr);

composition C-7: citraconimido-alkoxysilane (4.7 phr).

Composition C-6 is the control of the test, and composition C-7 is the one according to the invention. Tables 5 and 6 show the formulation of the two compositions, and their properties before and after curing. The attached FIG. 2 shows the curves of modulus (in MPa) as a function of the elongation (in %), these curves being marked C6 and C7, and corresponding to compositions C-6 and C-7, respectively.

The results of Table 6 show once again, in the isoprene matrix, the overall superiority of the citraconimido-alkoxysilane compared with the conventional TESPT coupling agent. Composition C-7 exhibits equivalent viscosity in the uncured state, resistance to scorching (T5) and properties at break, combined with higher values of moduli M100, M300 and ratio (M300/M100), which clearly illustrates improved coupling, as confirmed by the curves C6 and C7 of FIG. 2. The curve C7 is located distinctly above curve C-6, independent of the elongation in question.

D) Test 4

This test shows that the citraconimido-alkoxysilane coupling agent, which is of particularly high performance when combined with an isoprene elastomer, on the other hand proves ineffective in the absence of such an elastomer, especially when the diene elastomer used consists entirely of a synthetic elastomer such as SBR conventionally used for example in treads for passenger-car tires.

For this test, three compositions based on NR and/or SBR elastomer, reinforced with silica and all three using citraconimido-alkoxysilane as coupling agent are prepared. These compositions are distinguished above all by the quantity of natural rubber used:

composition C-8: 100 phr of NR;

composition C-9: 50 phr of NR mixed with 50 phr of SBR;

composition C-10: 100 phr of SBR.

Only compositions C-8 and C-9 are therefore in accordance with the invention, the control composition C-10 not containing isoprene elastomer.

Tables 7 and 8 show the formulation of the compositions, and their properties before and after curing. The quantity of silica has been increased in compositions C-9 and C-10 to make allowance for the presence of the SBR diene elastomer requiring, in known manner, a higher amount of reinforcing inorganic filler than an isoprene elastomer. The citraconimido-alkoxysilane coupling agent is used in a substantially constant amount (about 9.5% by weight) relative to the quantity of silica.

FIG. 3 shows the curves of modulus as a function of the elongation, these curves being marked C8 to C10, and corresponding to compositions C-8 to C-10 respectively.

A study of the results of Table 8 shows that the control composition C-10 (SBR), compared with the composition according to the invention C-8 (NR), has, in addition to an increase in plasticity (expected owing to the nature of the elastomers tested), properties after curing which are distinctly degraded, with a great reduction in the values of moduli at high deformation, M100 and M300. FIG. 3 only confirms this result, with a curve C10 located very much below the curve C8, whatever the elongation in question.

All this is a clear indicator to the person skilled in the art of insufficient coupling between the SBR diene elastomer and the reinforcing inorganic filler in the case of composition C-10 (devoid of isoprene elastomer).

As for the composition C-9 according to the invention, it will be noted that it has intermediate reinforcement properties, which are still satisfactory (see values of modulus M100 and M300, which are close to those of composition C-8) due to the presence of a certain quantity (50 phr) of isoprene elastomer.

E) Test 5

This last test illustrates another preferred embodiment of the invention, in which a covering agent for the reinforcing inorganic filler is associated with the citraconimido-alkoxysilane coupling agent.

By improving in particular the dispersion of the inorganic filler in the isoprene matrix, the latter is capable of increasing the overall effectiveness of the coupling, thus making it possible to reduce the quantity of citraconimido-alkoxysilane without adversely affecting the coupling properties. This covering agent is preferably a hydroxylated polyorganosiloxane, in particular an α,ω-dihydroxy-polyorganosiloxane. It is incorporated in the composition according to the invention at the same time as the citraconimido-alkoxysilane (non-productive stage).

For this test, two compositions which are identical, apart from the following differences, are compared:
  composition C-11: TESPT coupling agent (4 phr);
  composition C-12: citraconimido-alkoxysilane (3 phr)+ covering agent (1 phr).

Composition C-11 is the control of the test, and is identical to the control composition C-1 of the preceding Test 1. Composition C-12 is the composition according to the invention, similar to composition C-2 of the preceding Test 1, but containing a 40% reduction in the quantity of citraconimido-alkoxysilane (i.e., 3 phr instead of 4.7 phr). Due to the presence of the covering agent, this quantity is advantageously, less than 8% (precisely 6%) by weight relative to the quantity of reinforcing inorganic filler.

Tables 9 and 10 show the formulation of the different compositions, and their properties before and after curing (150° C., 25 minutes).

A study of the results of Table 10 shows that, unexpectedly, the composition C-12 according to the invention still has, despite a greatly reduced amount of coupling agent, a compromise of properties which is improved overall compared with the control composition C-11 using TESPT. Composition C-12 has a similar (and low) Mooney plasticity to control composition C-11, slightly better resistance to scorching (T5). After curing, composition C-12 has equivalent properties at break (stress and elongation) to control composition C-11 and exhibits the same compromise as far as the hysteresis properties ($\tan(\delta)_{max}$ and $\Delta G^*$) are concerned. In addition, moduli at high deformation (M100, M300) and a ratio M300/M100 which are slightly higher than control composition C-11, which is synonymous with better reinforcement, causing better coupling between the elastomer and the reinforcing inorganic filler.

In summary, the alkoxysilane selected for the compositions according to the invention, based on isoprene elastomer and reinforcing inorganic filler, imparts to the latter high reinforcement properties in the vulcanized state combined with low hysteresis, while offering very good processing properties in the uncured state (reduced viscosity).

This alkoxysilane, due to its specific citraconimide function, reveals not only an overall performance which is distinctly superior to that of other known alkoxysilanes of the type having an activated double ethylene bond, but also demonstrates, unexpectedly, an effectiveness greater than that of the polysulphurised alkoxysilane TESPT, the reference coupling agent for the rubber compositions reinforced with an inorganic filler such as silica.

The invention can be applied particularly advantageously in rubber compositions usable for the manufacturing of treads for tires which have both low rolling resistance and high wear resistance, especially when these treads are exclusively based on polyisoprene and are intended for tires for industrial vehicles of the heavy-vehicle type.

TABLE 1

| Composition No. | C-1 | C-2 | C-3 |
|---|---|---|---|
| NR (1) | 100 | 100 | 100 |
| silica (2) | 50 | 50 | 50 |
| silane (3) | 4 | — | — |
| silane (4) | — | 4.7 | — |
| silane (5) | — | — | 3.7 |
| ZnO | 3 | 3 | 3 |
| stearic acid | 2.5 | 2.5 | 2.5 |
| antioxidant (6) | 1.9 | 1.9 | 1.9 |
| sulphur | 1.5 | 1.5 | 1.5 |
| accelerator (7) | 1.8 | 1.8 | 1.8 |

(1) natural rubber;
(2) silica type "HD" - "Zeosil 1165 MP" from Rhodia in the form of microbeads (BET and CTAB: approximately 150–160 m²/g);
(3) TESPT ("Si69" from Degussa);
(4) citraconimido-alkoxysilane: N-(propyltriethoxysilyl)citraconimide;
(5) trimethoxysilylpropyl methacrylate ("Dynasylan Memo" from Hüls);
(6) N-1,3-dimethylbutyl-N-phenyl-para-phenylenediamine ("Santoflex 6-PPD" from Flexsys);
(7) N-cyclohexyl-2-benzothiazyl sulphenamide ("Santocure CBS" from Flexsys).

TABLE 2

| Composition No. | C-1 | C-2 | C-3 |
|---|---|---|---|
| Properties before curing: | | | |
| Mooney (MU) | 29 | 30 | 29 |
| T5 (min) | 22 | 30 | 30 |

TABLE 2-continued

| Composition No. | C-1 | C-2 | C-3 |
|---|---|---|---|
| Properties after curing: | | | |
| M10 (MPa) | 4.4 | 4.3 | 3.4 |
| M100 (MPa) | 1.7 | 1.6 | 1.2 |
| M300 (MPa) | 1.8 | 2.0 | 1.4 |
| M300/M100 | 1.06 | 1.25 | 1.17 |
| Breaking stress (MPa) | 29 | 29 | 30 |
| Elongation at break (%) | 605 | 580 | 673 |
| $\tan(\delta)_{max}$ | 0.18 | 0.19 | 0.19 |
| $\Delta G^*$ | 2.1 | 1.8 | 1.6 |

TABLE 3

| Composition No. | C-4 | C-5 |
|---|---|---|
| NR (1) | 100 | 100 |
| silica (2) | 50 | 50 |
| silane (4) | 4.7 | — |
| silane (8) | — | 4.5 |
| ZnO | 3 | 3 |
| stearic acid | 2.5 | 2.5 |
| antioxidant (6) | 1.9 | 1.9 |
| sulphur | 1.5 | 1.5 |
| accelerator (7) | 1.8 | 1.8 |

(1) to (7) idem Table 1;
(8) maleimido-alkoxysilane: N-(propyltriethoxysilyl)maleimide.

TABLE 4

| Composition No. | C-4 | C-5 |
|---|---|---|
| Properties before curing: | | |
| Mooney (MU) | 30 | 72 |
| T5 (min) | 30 | 30 |
| Properties after curing: | | |
| M10 (MPa) | 4.3 | 3.6 |
| M100 (MPa) | 1.6 | 1.7 |
| M300 (MPa) | 2.0 | 2.2 |
| M300/M100 | 1.25 | 1.29 |
| Breaking stress (MPa) | 29 | 29 |
| Elongation at break (%) | 580 | 465 |

TABLE 5

| Composition No. | C-6 | C-7 |
|---|---|---|
| NR (1) | 100 | 100 |
| alumina (9) | 80 | 80 |
| silane (3) | 4 | — |
| silane (4) | — | 4.7 |
| ZnO | 3 | 3 |
| stearic acid | 2.5 | 2.5 |
| antioxidant (6) | 1.9 | 1.9 |
| sulphur | 1.5 | 1.5 |
| accelerator (7) | 1.8 | 1.8 |

(1) to (7) idem Table 1;
(9) alumina "Baikalox CR125" from Baïkowski, in the form of powder (BET: approximately 105 m²/g).

TABLE 6

| Composition No. | C-6 | C-7 |
|---|---|---|
| Properties before curing: | | |
| Mooney (MU) | 43 | 43 |
| T5 (min) | 12 | 12 |

TABLE 6-continued

| Composition No. | C-6 | C-7 |
|---|---|---|
| Properties after curing: | | |
| M10 (MPa) | 4.0 | 5.0 |
| M100 (MPa) | 1.3 | 1.5 |
| M300 (MPa) | 1.2 | 1.6 |
| M300/M100 | 0.92 | 1.07 |
| Breaking stress (MPa) | 27 | 31 |
| Elongation at break (%) | 639 | 650 |

TABLE 7

| Composition No. | C-8 | C-9 | C-10 |
|---|---|---|---|
| NR (1) | 100 | 50 | — |
| SBR (10) | — | 50 | 100 |
| silica (2) | 50 | 65 | 80 |
| silane (4) | 4.7 | 6.2 | 7.6 |
| ZnO | 3 | 3 | 3 |
| aromatic oil (11) | — | 18.75 | 37.5 |
| DPG (12) | 1.5 | 1.5 | 1.5 |
| stearic acid | 2.5 | 2.5 | 2.5 |
| antioxidant (6) | 1.9 | 1.9 | 1.9 |
| sulphur | 1.3 | 1.3 | 1.3 |
| accelerator (7) | 1.9 | 1.9 | 1.9 |

(1) to (7) idem Table 1;
(10) solution SBR with 77% of butadiene units (58% of 1–2; 23% of trans); 23% of styrene units; extended with 37.5% by weight of oil (or 37.5 phr of oil per 100 phr of dry SBR); expressed in dry SBR; Tg = −29° C.;
(11) aromatic extender oil for the SBR;
(12) diphenylguanidine ("Vulcacit D" from BAYER);

TABLE 8

| Composition No. | C-8 | C-9 | C-10 |
|---|---|---|---|
| Properties before curing. | | | |
| Mooney (MU) | 30 | 56 | 57 |
| T5 (min) | 30 | 30 | 26 |
| Properties after curing. | | | |
| M10 (MPa) | 4.3 | 6.0 | 5.9 |
| M100 (MPa) | 1.6 | 1.6 | 1.1 |
| M300 (MPa) | 2.0 | 1.8 | 1.1 |
| M300/M100 | 1.25 | 1.13 | 1.0 |
| Breaking stress (MPa) | 29 | 20 | 22 |
| Elongation at break (%) | 580 | 570 | 804 |

TABLE 9

| Composition No. | C-11 | C-12 |
|---|---|---|
| NR (1) | 100 | 100 |
| silica (2) | 50 | 50 |
| silane (3) | 4 | — |
| silane (4) | — | 3 |
| PDMS (13) | — | 1 |
| ZnO | 3 | 3 |
| stearic acid | 2.5 | 2.5 |
| antioxidant (6) | 1.9 | 1.9 |
| sulphur | 1.5 | 1.5 |
| accelerator (7) | 1.8 | 1.8 |

(1) to (7) idem Table 1;
(13) α,ω-dihydroxy-polymethylsiloxane (oil "Rhodorsil 48V50" from Rhodia).

TABLE 10

| Composition No. | C-11 | C-12 |
|---|---|---|
| Properties before curing: | | |
| Mooney (MU) | 29 | 30 |
| T5 (min) | 22 | 30 |
| Properties after curing. | | |
| M10 (MPa) | 4.4 | 4.8 |
| M100 (MPa) | 1.7 | 1.8 |
| M300 (MPa) | 1.8 | 2.1 |
| M300/M100 | 1.06 | 1.17 |
| Breaking stress (MPa) | 29 | 28 |
| Elongation at break (%) | 605 | 570 |
| $\tan(\delta)_{max}$ | 0.18 | 0.18 |
| $\Delta G^*$ | 2.1 | 2.0 |

The invention claimed is:

1. A rubber composition based on an isoprene elastomer, a reinforcing inorganic filler and an inorganic filler/isoprene elastomer coupling agent, wherein said coupling agent is a citraconimido-alkoxysilane as set forth in formula I:

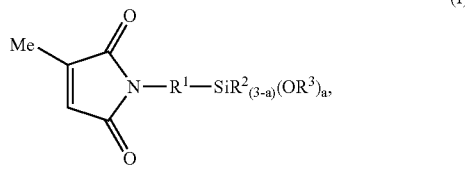

wherein "a" is equal to 1, 2, or 3, $R^1$ is a divalent group, and $R^2$ and $R^3$ are monovalent hydrocarbon groups, and wherein said reinforcing inorganic filler is present in an amount between 10 and 200 phr (parts by weight to one hundred parts of elastomer or rubber).

2. The composition according to claim 1, wherein the isoprene elastomer is selected from the group consisting of natural rubber, synthetic cis-1,4 polyisoprenes and mixtures of thereof.

3. The composition according to claim 1, wherein said citraconimido-alkoxysilane is present in a amount greater than 0.5 phi (parts by weight per hundred parts of isoprene elastomer).

4. The composition according to claim 3, wherein the amount of citraconimido-alkoxysilane is between 1 and 15 phi.

5. The composition according to claim 1, wherein the amount of citraconimido-alkoxysilane is less than 5 phi.

6. The composition according to claim 1, wherein the citraconimido-alkoxysilane is selected from among N-[(($C_1$-$C_3$)alkyl-($C_1$-$C_3$)alkoxysilyl)]citraconimides.

7. The composition according to claim 6, wherein the citraconimido-alkoxysilane is selected from among N-[(propyl-($C_1$-$C_3$)alkoxysilyl)]citraconimides.

8. The composition according to claim 1, wherein the citraconimido-alkoxysilane is present in an amount between 0.5% and 20% by weight relative to the reinforcing inorganic filler.

9. The composition according to claim 1, wherein the amount of citraconimido-alkoxysilane represents less than 10% by weight relative to the reinforcing inorganic filler.

10. The composition according to claim 1, wherein the reinforcing inorganic filler consists of silica.

11. The composition according to claim 1, further comprising carbon black.

12. The composition according to claim 11, wherein the carbon black is present in an amount from 5 to 15 phr.

13. The composition according to claim 2, wherein the isoprene elastomer is natural rubber.

14. The composition according to claim 6, wherein the citraconimido-alkoxysilane is an N-(propylethoxysily)citraconimide.

15. The composition according to claim 13, wherein the citraconimido-alkoxysilane is N-(propyltriethoxysilyl)citraconimide.

16. The composition according to claim 1, further comprising a covering agent for the inorganic filler.

17. The composition according to claim 1, wherein said composition is in the vulcanized state.

18. A process for preparing an elastomeric composition, comprising kneading thermomechanically, in one or more stages, until a maximum temperature of between 110° C. and 190° C. is reached, at least (i) an isoprene elastomer with at least (ii) an inorganic filler as reinforcing filler, and (iii) a citraconimido-alkoxysilane as an inorganic filler/isoprene elastomer coupling agent.

19. The process according to claim 18, wherein the maximum kneading temperature is between 130° C. and 180° C.

20. The process according to claim 18, wherein the citraconimido-alkoxysilane is selected from among N-[(($C_1$-$C_3$)alkyl-($C_1$-$C_3$)alkoxysilyl)]citraconimides.

21. The process according to claim 20, wherein the citraconimido-alkoxysilane is selected from among N-[(propyl-($C_1$-$C_3$)alkoxysilyl)]citraconimides.

22. The process according to claim 21, wherein the citraconimido-alkoxysilane is an N-(propylethoxysilyl)citraconimide.

23. The process according to claim 21, wherein the citraconimido-alkoxysilane is N-(propyltriethoxysilyl)citraconimide.

24. A tire comprising a rubber composition based on an isoprene elastomer, an inorganic filler as reinforcing filler and an inorganic filler/isoprene elastomer coupling agent, wherein said coupling agent is a citraconimido-alkoxysilane.

25. The tire according to claim 24, wherein the isoprene elastomer is selected from the group consisting of natural rubber, synthetic cis-1,4 polyisoprenes and mixtures thereof.

26. The tire according to claim 24, wherein the reinforcing inorganic filler is present in the composition in an amount of between 10 and 200 phr (parts by weight to one hundred parts of elastomer or rubber).

27. The tire according to claim 24, wherein the citraconimido-alkoxysilane is present in the composition in an amount greater than 0.5 phi (parts by weight per hundred parts of isoprene elastomer).

28. The tire according to claim 27, wherein the quantity of citraconimido-alkoxysilane is present in the composition in an amount of between 1 and 15 phi.

29. The tire according to claim 24, wherein the citraconimido-alkoxysilane is selected from among N-[(($C_1$-$C_3$)alkyl-($C_1$-$C_3$)alkoxysilyl)]citraconimides.

30. The tire according to claim 29, wherein the citraconimido-alkoxysilane is selected from among N-[(propyl-($C_1$-$C_3$)alkoxysilyl)]citraconimides.

31. The tire according to claim 24, wherein the citraconimido-alkoxysilane is present in the composition in an amount of between 0.5% and 20% by weight relative to the reinforcing inorganic filler.

32. The tire according to claim 24, wherein the amount of citraconimido-alkoxysilane represents less than 10% by weight relative to the reinforcing inorganic filler.

33. The tire according to claim 24, wherein the reinforcing inorganic filler consists of silica.

34. The tire according to claim 24, further comprising carbon black.

35. The tire according to claim 34, wherein the carbon black is present in an amount from 5 to 15 phr.

36. The tire according to claim 25, wherein the isoprene elastomer is natural rubber.

37. The tire according to claim 30, wherein the citraconimido-alkoxysilane is a N-(propylethoxysilyl)citraconimide.

38. The tire according to claim 30, wherein the citraconimido-alkoxysilane is N-(propyltriethoxysilyl)citraconimide.

39. The tire according to claim 24, further comprising a covering agent for the inorganic filler.

40. The tire according to claim 24, wherein the amount of citraconimido-alkoxysilane is less than 5 phi.

41. The tire according to claim 24, wherein said tire is in the vulcanized state.

42. The tire according to claim 24, wherein said tire is a heavy-vehicle tire.

43. A tire tread comprising a rubber composition based on an isoprene elastomer, an inorganic filler as reinforcing filler and an inorganic filler/isoprene elastomer coupling agent, wherein said coupling agent is a citraconimido-alkoxysilane.

44. The tread according to claim 43, wherein the isoprene elastomer is selected from the group consisting of natural rubber, synthetic cis-1,4 polyisoprenes and mixtures thereof.

45. The tread according to claim 43, wherein the reinforcing inorganic filler is present in the composition in an amount of between 10 and 200 phr (parts by weight to one hundred parts of elastomer or rubber).

46. The tread according to claim 43, wherein the citraconimido-alkoxysilane is present in a amount greater than 0.5 phi (parts by weight per hundred parts of isoprene elastomer).

47. The tread according to claim 46, wherein the amount of citraconimido-alkoxysilane is between 1 and 15 phi.

48. The tread according to claim 43, wherein the citraconimido-alkoxysilane is selected from among N-[(($C_1$-$C_3$)alkyl-($C_1$-$C_3$)alkoxysilyl)]citraconimides.

49. The tread according to claim 48, wherein the citraconimido-alkoxysilane is selected from among N-[(propyl-($C_1$-$C_3$)alkoxysilyl)]citraconimides.

50. The tread according to claim 43, wherein the citraconimido-alkoxysilane is present in the composition in an amount of between 0.5% and 20% by weight relative to the reinforcing inorganic filler.

51. The tread according to claim 43, wherein the amount of citraconimido-alkoxysilane represents less than 10% by weight relative to the amount of reinforcing inorganic filler.

52. The tread according to claim 43, wherein the reinforcing inorganic filler consists of silica.

53. The tread according to claim 43, further comprising carbon black.

54. The tread according to claim 53, wherein the carbon black is present in an amount from 5 to 15 phr.

55. The tread according to claim 44, wherein the isoprene elastomer is natural rubber.

56. The tread according to claim 49, wherein the citraconimido-alkoxysilane is a N-(propylethoxysilyl)citraconimide.

57. The tread according to claim 56, wherein the citraconimido-alkoxysilane is N-(propyltriethoxysilyl)citraconimide.

58. The tread according to claim 43, further comprising a covering agent for the inorganic filler.

59. The tread according to claim 43, wherein the quantity of citraconimido-alkoxysilane is less than 5 phi.

60. The tread according to claim 43, wherein said tread is in the vulcanized state.

61. The tread according to claim 43, wherein said tread is incorporated into a heavy-vehicle tire.

* * * * *